June 6, 1967

H. ÜBLACKER 3,323,216

LATERAL DEFORMATION INDICATOR

Filed Dec. 22, 1964

INVENTOR.
Horst Üblacker
BY *Van Valkenburgh & Lowe*

ATTORNEYS

INVENTOR.
Horst Üblacker

United States Patent Office 3,323,216
Patented June 6, 1967

3,323,216
LATERAL DEFORMATION INDICATOR
Horst Üblacker, Lakewood, Colo., assignor to Terrametrics, a division of Patrick Harrison, Inc., Golden, Colo., a corporation of Florida
Filed Dec. 22, 1964, Ser. No. 420,414
22 Claims. (Cl. 33—86)

This invention relates to instruments adapted to measure lateral deflections along a given course or datum line, and more particularly to instruments for measuring lateral deflections of earth and rock movement along a course such as that established by a borehole extending into a rock mass or the like. As such, the invention will be hereinafter called a "lateral deformation indicator" and first described with reference to its use in a borehole. It is to be understood, however, that the apparatus is not restricted to use in a borehole.

It is often important to know the movements and deformations in rock masses such as in dam abutments, tunnels, and the like. One mode of observing such deformations is to drill a borehole into the rock and then measure the movement of the rock in various directions with respect to the axis of the borehole such as longitudinal and lateral displacements at various points within the reach of the borehole. The present invention concerns apparatus for measurement of lateral deflections, especially deflections in a selected reference plane intersecting the borehole axis, such as vertical and horizontal reference planes.

Visual observations are often possible, but such are limited by the depth and straightness of a borehole, limited in accuracy, are necessarily intermittent and are necessarily restricted to easily accessible locations. Accordingly, visual systems are usually not practical.

It follows that attempts have been made to devise mechanical and electrical instruments for measuring of lateral deflections along a course such as in a borehole. Such instruments consist basically of a train of rods linked together by pivotal connections. The rods are anchored at each pivot connection, and the angular deflection between the adjacent rods is measured at each pivot to provide data from which the lateral displacement of the rock mass may be computed. Such systems are limited in many respects. Fixed-length rods prevent a careful selection of reference positions within a borehole, and comparatively short rods are required to obtain significant readings. This makes such a system very expensive. Also, the effects of friction and wear of moving parts render the apparatus insensitive to the very minute angular deflections which occur when the apparatus is measuring small lateral movements in a borehole. Whenever the course or borehole is greater than 20 meters in distance or depth, the effects of friction and wear will completely mask ordinary lateral earth and rock movements.

The present invention was conceived and developed to overcome the disadvantages inherent in conventional systems, and the invention comprises, in one preferred embodiment, a wire extended through the borehole, held in tension, and laterally restrained by the borehole walls at selected measuring locations along the course of the borehole. Accordingly, the wire will move and bend at these locations as lateral movement of the rock mass occurs. The resulting angular deflections of the wire at these selected locations may then be measured with considerable accuracy by sensitive transducer systems and furnish data from which the actual lateral movements of the rock mass with respect to the borehole may be computed. It is usually desirable to know a component of actual movement, as that in a selected reference plane, and the apparatus is especially adapted for measuring only movement components in such selected reference planes.

Another embodiment of the invention is incorporated in apparatus adapted to measure lateral deformation as it is inserted into a borehole. Such apparatus, which will be called a "chain deflectometer," contemplates a body tube which remains axially aligned with the borehole course and a projecting arm which deflects with respect to the body responsive to changes in axial alignment ahead of the body. In this embodiment, the wire extends through the projecting arm and into the body tube. The wire is restrained at a point in the body tube adjacent to the extended arm, and wire movement deflections from this point are measured as the arm deflects.

The invention uses the inherent property of a wire, or thin spring, to flex about a point without any significant frictional effect, and it follows that such arrangements of wires and springs may be used not only in a borehole, but also along a curved course or even about a closed path to provide improved measuring systems.

The primary object of the present invention is to provide a novel and improved lateral deformation indicator which is highly sensitive and capable of measuring small lateral deformations along a reach of considerable distance.

Other objects of the invention are to provide a novel and improved lateral deformation indicator: which is especially adapted to be installed in a borehole for measurement of lateral rock movement along the substantially straight course of the borehole, and is also adapted for installations as along a rock face having a curved course and even about a closed course; which is especially adapted to measure only components of a movement as in a selected reference plane, such as a vertical plane, and then be rotated for subsequent measurement of components of movement in another reference plane; which uses a friction-free arrangement of parts capable of deflecting responsive to the slightest movement and capable of being measured with conventional, easily-obtained types of transducers and sensors; which is capable of measuring movements continuously; which is a low-inertia system capable of measuring and indicating rapid movements of the rock mass as they occur; and, which is an inexpensive, easily-installed, easily-calibrated unit that once calibrated remains stable in its calibration for long periods of time.

Another object of the invention is to provide a novel and improved construction of a "chain deflectometer" which is adapted to be inserted into a borehole and to measure changes in the alignment of the borehole during an insertion operation with a high degree of precision.

With the foregoing and other objects in view, all of which more fully hereinafter appear, my invention comprises certain constructions, combinations and arrangements of parts and elements as hereinafter described, defined in the appended claims and illustrated in preferred embodiments in the accompanying drawings, in which:

Referring to the drawing, the first embodiment is disclosed at FIGS. 1 through 10. A borehole 1 is drilled into a rock mass along a selected course where it is desirable to measure lateral displacements of the rock mass. To prepare this borehole, it is desired that this hole be sufficiently large to first receive a casing 2 into which the apparatus is adapted to fit, and the casing 2 being grouted into place as by grout g illustrated at FIG. 4.

Preferably such casing 2 is of rigid, plastic, tubular material which will be circular and straight when it is first installed. However, this tube must be able to deflect as the rock mass deforms, without resisting the earth movements. The bottom of the hole is closed by grout, and an anchor 3 is secured therein to hold an end of the measure wire 6.

The deformation indicator 5 is adapted to be inserted into the hole, and the primary element of this indicator is the wire 6 which is adapted to extend into the hole 1, with one end being secured to the anchor 3 at the bottom of the hole. The other end of the wire 6 extends from the mouth of the hole and is connected to a spring S within a tension box 4. The box 4 is mounted upon an abutment $a$ at the mouth of the hole 1. The spring S is adapted to hold the wire under tension so that there will be a minimum sag between the deflection indicators 5 which are arranged within the hole at selected spacings.

These deflection indicators 5 are positioned along the course of the borehole in any suitable manner, as might be determined by field conditions, such as between faults and slip planes encountered when drilling the hole. Each deflection indicator is adapted to be positioned in the casing 2 to hold the wire 6 at a fixed point so that at this point the wire 6 will move with lateral movements of the borehole and thereby introduce angular deflections to the wire 6 modifying its initial alignment. Transducers T are arranged to precisely measure the angular deflections at each point. Suitable electrical cables 8 hold the circuit wires of the transducers T to permit them to extend to the mouth of the hole where they are connected to a conventional type of switching unit 9 and recording apparatus 10.

Figure 1:
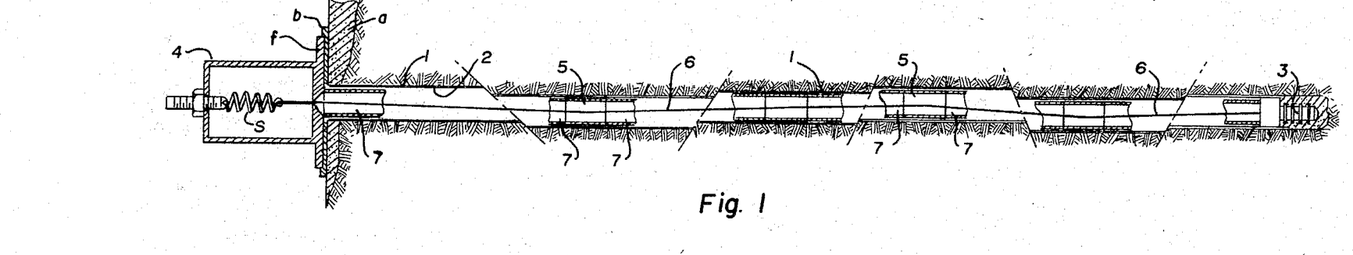
FIGURE 1 is a diagrammatic longitudinal sectional view of a borehole, wherein the improved lateral deflectometer is installed, the view showing earth movements as along slip planes in an exaggerated manner to illustrate the nature of lateral deformations which may occur and also showing the diameter of the borehole in an exaggerated proportion to better illustrate portions of the apparatus shown therein.

Each indicator 5 is adapted to measure deflection components in a selected plane, and connecting pipes 7 hold the group of indicators together for operation in a common plane. The group is adapted to rotate in unison within the borehole 1 so that measurements may be made in different planes, for example, in a horizontal plane, as illustrated, and then in a vertical plane. Rotation is conveniently effected by extending a pipe member 7 to the mouth of the hole and connecting this pipe 7 with a flange $f$ which may be within the housing 4 or carry the housing 4, as illustrated at FIG. 1. This flange $f$ may be mounted upon a base flange $b$ which, in turn, is secured to the abutment $a$ at the mouth of the hole to support the assembly. This rotation of the indicators 5 and pipe 7 will not twist the wire 6 to any significant degree, and the inner end of the wire may be solidly secured to the abutment 3.

Each individual deflector indicator 5 is carried within a short cylindrical housing 11, and each end of the housing is secured to a supporting head 12. Each head 12 is a short cylindrical member having rabbeted ends for smooth connection with the housing 11 and the adjacent end of the spacing pipe 7. The heads are secured to the ends of the housing and pipes as by screws 13.

Each spacing head 12 carries three spring-loaded balls or rollers 14 arranged at 120 degree spacings, and each roller is adapted to bear against the inner wall of the casing 2 to permit rotation of the indicator 5 about the central axis of the casing 2 and hold the indicator in position in proper longitudinal alignment. The spacing pipes 7 are light-weight members which will flex with lateral movements or rotation within the borehole without causing any significant change in the alignment of the indicator housing 11 with respect to the axis of the borehole. However, where deflections may be comparatively large, the apparatus may be modified as in the manner illustrated at FIGS. 12 and 13 where a head 12' is modified to connect with a spacing pipe 7' through a universal joint as provided by a gimbal ring R and protected by a rubber collar K.

It is also to be noted that any irregularities in the alignment of the indicator 5 will not affect the final results of the apparatus because the measurements of the lateral wire deflections are based upon changes of alignment between adjacent reaches of wire, from each side of the holding point, which may occur independently of the alignment of the indicator itself.

The housing 11 is divided into two components by a transversely disposed disc 15 whose edges are secured to the housing by a radial array of screws 16. The wire 6 extends through a support orifice 17 in the disc, which is formed by countersinking from both sides of the disc to form a knife-edged member whereagainst the tensed wire will deflect in any direction. The orifice is offset from the center axis of the housing and is located on a diametrical line which constitutes the axis of the measured lateral deflection components. Accordingly, the plane defined by the longitudinal axis and this diametrical axis line, through the orifice, is the plane normal to measured deflection components and will be hereinafter referred to as the "normal plane."

Diametrically opposed notches 18 and 18' are cut in the outer portions in the disc to provide radial holding surfaces 19 and 19' which are substantially in said "normal plane." Flat springs 20 and 20' are secured to each radial surface 19 and 19' to lie in spaced parallelism in the normal plane and at opposite sides of the wire extending through the orifice 17. It follows that flexing of the flat springs is restricted to lateral movements out of the normal plane. The springs are deflected out of the plane by movements of the wire 6, but components of movement of the wire along the normal plane are not registered by the apparatus, as will be explained.

Each spring extends from each side of the disc with one end being adapted to hold the wire, the right side in the drawing, and the other end being adapted to carry the transducer T for measuring the total deflection between the two ends as the wire is deflected, the left side in the drawing. The springs 20 and 20' are connected together at their right end by a clamp plate 21R to form a yoke-like structure, and a longitudinally disposed tubular arm 24R outstands from this clamp plate. The wire 6 is within this arm 24R, and a longitudinally disposed, arched, flat spring 25 is mounted in this arm with its ends 26 contacting the wire at one side of the normal plane. Pins 27 are positioned in the arm against the ends 26 of the spring at the opposite side of the wire 6. Accordingly, the wire is held between the ends 26 of the spring and the pins 27, as in the manner illustrated at FIG. 5. It follows that components of wire movement out of the normal plane deflect the arm 24 and the springs 20 and 20' while components of wire movement parallel to the normal plane slide between the spring ends and the pins without effecting the action of the apparatus.

The opposite ends of the springs 20 and 20' are likewise connected to a clamp plate 21L, similar to, but of opposite hand of the connecting piece 21R. This clamp plate 21L also carries a longitudinally disposed arm 24L similar in construction to that heretofore described, but being of opposite hand and including a spring 25 and pins 27, as heretofore described.

This arm 24L also carries the electric transducer T for indicating the component of angular movement of the measuring wire 6, as measured by deflection between the arm 24R and arm 24L. This transducer is based on the movement of an armature 36 within a solenoid 44, with the varying electrical induction effect providing measurements of minute deflections. One component thereof, the armature 36, is secured to the arm 24L, as will be described. The other component, the solenoid 44, is attached to the extended end of a tongue 38, which is a flat, rigid member attached to the clamp plate 21R. This tongue extends from clamp plate 21R, through an opening 39' in the disc 15 and through a second opening 39 in the clamp plate 21L to lie alongside the arm 24L in spaced parallelism with the flat springs 20 and 20' when the several members are not deflected and are in the normal plane above defined. The tongue 38 is adapted to flex out of the normal plane position responsive to flexure of the springs 20 and 20' so that it will remain in alignment with the arm 24R. However, the extended end of the tongue 38 will shift laterally and out of position with respect to the adjacent end of the arm 24L, to provide the movement of the armature with respect to the solenoid for measurement by the recording instruments 10.

The transducer includes a remotely controlled means for adjusting the armature 36 within the solenoid 44 to a zero-in position for the commencement of a series of measurements. This compensating means is carried upon a plate 28 secured to a side of the arm 24L. A portion of this plate depends from the arm to hold the flange 29 of an outstanding cylinder 30. A piston 31 within this cylinder is closed at its outer end 32 and is biased to move towards the tongue 38 by a spring 33 which is compressed between the piston and the cylinder end 32. The piston 31 carries an insertion rod 35 at the opposite side thereof which extends through a hole in the plate 28, through an orifice 40 in the tongue 38 and connects with the armature 36 which is at the opposite side of the tongue 38 and within the solenoid when in operation. The insertion rod 35 also includes a flat spring member 34 at its base portion adjacent to the piston to permit the armature to deflect slightly with respect to the piston to secure a proper alignment within the solenoid.

The solenoid 44 is mounted in a cylindrical case 43 having a head 42 at one end which is open at its end to receive the armature and rod 35, and open laterally as a flat socket 41 adapted to receive the end of the tongue 38, the tongue 38 thereby supporting the solenoid 44, with the opening 40 registering with the passageway through the solenoid. Accordingly, with this arrangement, the armature 36 moves into and out of the solenoid 44 responsive to deflections of the apparatus which change the alignment of the wire 6.

It is anticipated that the wire 6 will not be in perfect alignment at the commencement of any testing program and that a zeroing-in of the solenoid and armature will be necessary to establish an initial condition. This may be accomplished by merely reading gage differences on the records 10 at the beginning and at the end of a test. However, because of the characteristics of a solenoid and armature, it is desirable to move the armature to a null point at the beginning of each test to better record the subsequent readings. This is accomplished by the use of a servo-motor 45 which is mounted upon a plate 28 above the cylinder 30 and is connected with suitable control wires extending through a cable 8. This servo-motor carries an eccentric cam 47 attached to the motor shaft 46 as with a lock nut 48. The motor is arranged so that the cam 47 lies directly above the cylinder 30. The cylinder 30 is slotted at 30' and a follower 49 upstands from the piston through the slot 30' to resiliently bear against the face of the cam 47 responsive to the action of the spring 33. Accordingly, rotation of the servo-motor will permit the piston to move back and forth in its cylinder to shift the armature 36 to a proper position within the solenoid 44 where the null point in adjustments is attained. Such zeroing-in adjustments may be accomplished after installation and when a test is to be commenced.

Operation of the apparatus is manifest from the above description. After the borehole 1 is suitably cased, the anchor 3 and measuring wire 6 are secured. Next, the deformation indicators 5, carried by connecting pipes 7, are pushed into place and oriented to a selected plane such as a horizontal reference plane by rotating the flange $f$ at the base $b$ at the mouth of the hole. Next, each deflector indicator 5 is set to its null position by adjustments with its servo-motor 45.

A single test to determine rock movement will be concerned with wire deflection components only in the selected reference plane, and such a test may continue for several months. Readings of changes of deflection may be made at any selected interval of time during this period or even be made continuously. After a set of readings of deflection are determined in one reference plane, the instrument may be rotated to another reference plane, and the defletcor indicators 5 again set to their null positions and the operation repeated. Each test may consume a substantial period of time such, for example, several months.

Figure 2:
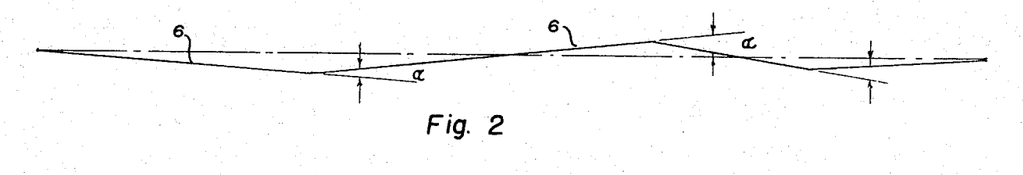
FIGURE 2 is a diagrammatic view of the deformation wire, per se, of the apparatus illustrated at FIG. 1, showing in an exaggerated manner its appearance when distorted by earth deformations such as suggested by FIG. 1.
Figures 3, 10:
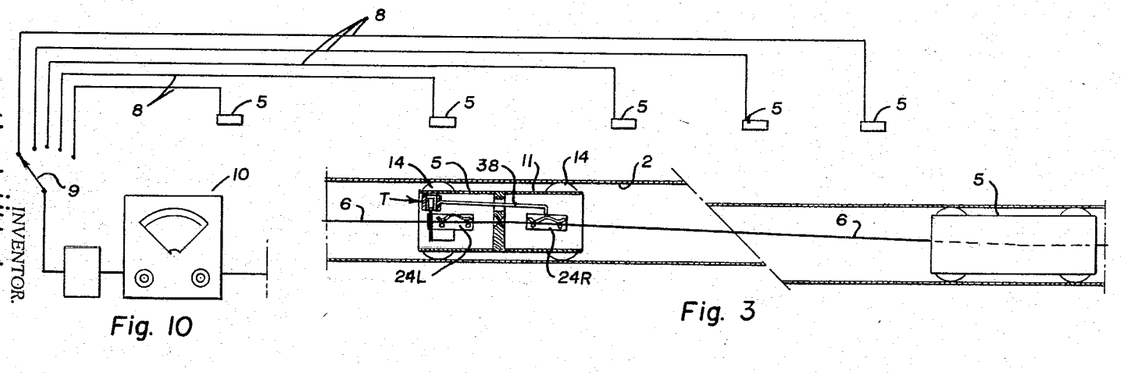
FIGURE 3 is a diagrammatic view illustrative of the operation of a deflection indicator of the type used in the apparatus, and illustrating the manner in which angular movements of the wire may be measured in a selected reference plane.
FIGURE 10 is a diagrammatic view of a block-circuit arrangement which may be used in the apparatus to record and measure deflections indicated by the transducers at the several deflection indicators.
Figure 4:
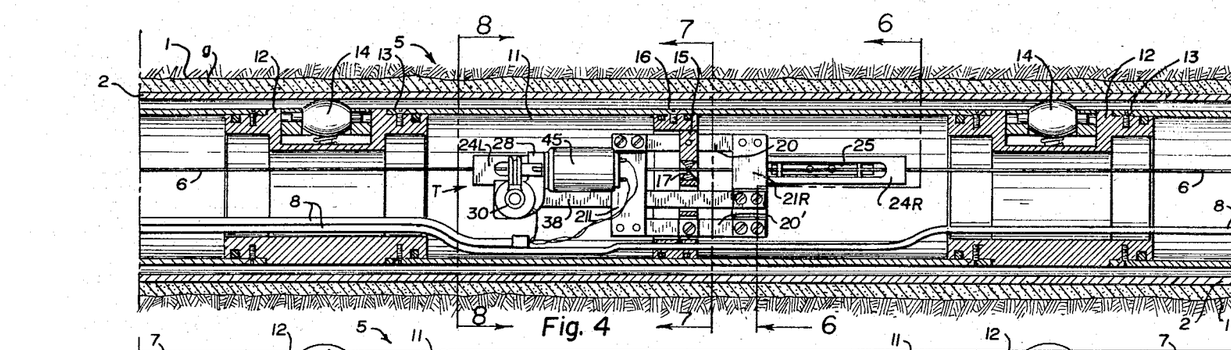
FIGURE 4 is a longitudinal vertical section through a deflection indicator of the type adapted to indicate deflections in a selected reference plane which constitutes one portion of the apparatus.
Figures 5, 6, 7, 8:
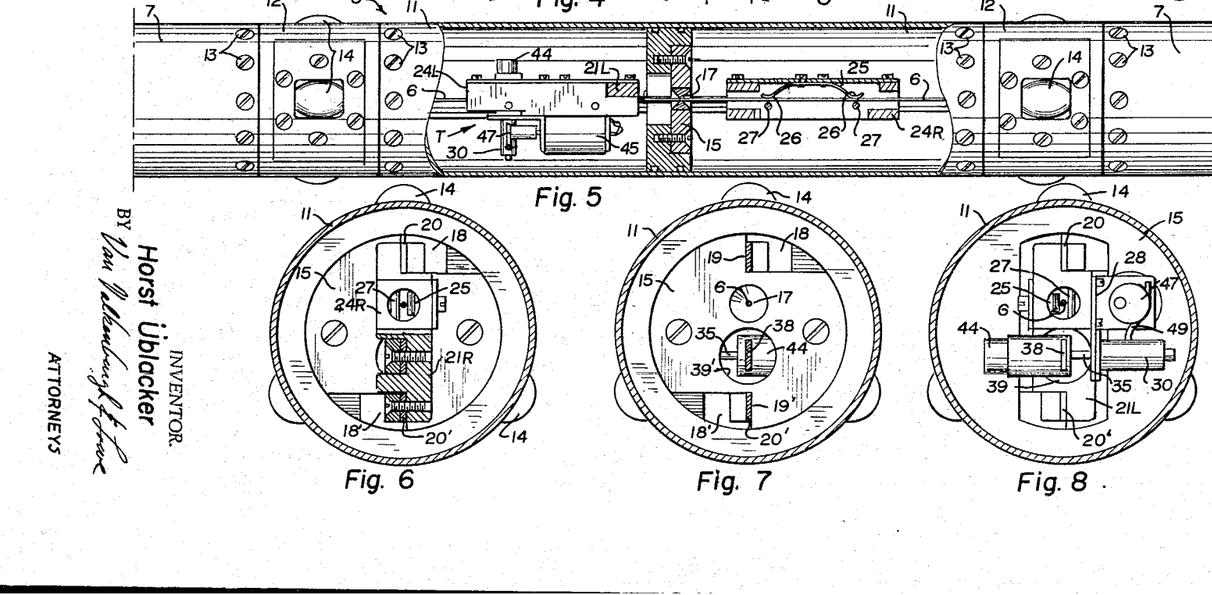
FIGURE 5 is a longitudinal horizontal section through the portion of the apparatus shown at FIG. 4.
FIGURES 6, 7 and 8 are transverse sectional views as taken from the respective lines 6—6, 7—7 and 8—8 of FIG. 4, but on an enlarged scale.
Figure 9:
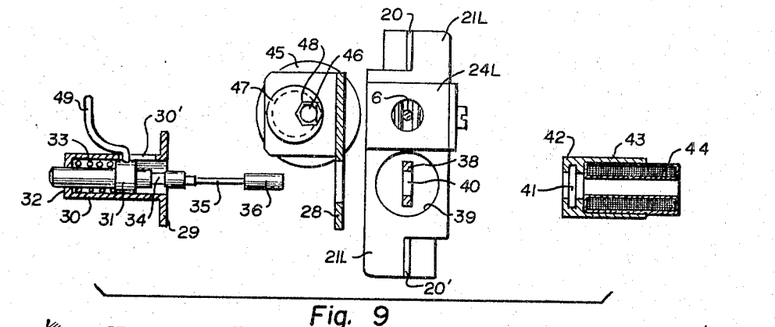
FIGURE 9 is an exploded view of a transducer unit used in the deflection indicator, as taken from the indicated arrow 9 at FIG. 4, but on an enlarged scale, and with certain of the components being shown in section to better illustrate their constructions.

The accuracy of the improved apparatus is enhanced because the tightly stretched wire bends at very small angles, and the deflection of the wire is substantially friction free. It was found that such an indicator could be built with the individual deformation indicators 5 being as far as 12 meters apart and still provide a sensitivity of approximately 0.01 millimeters. The measuring instrument 10 is calibrated to indicate the angular deflection of the wire, such as shown at FIG. 2, and total movements may be easily calculated with this information.

Figures 11, 12, 13:
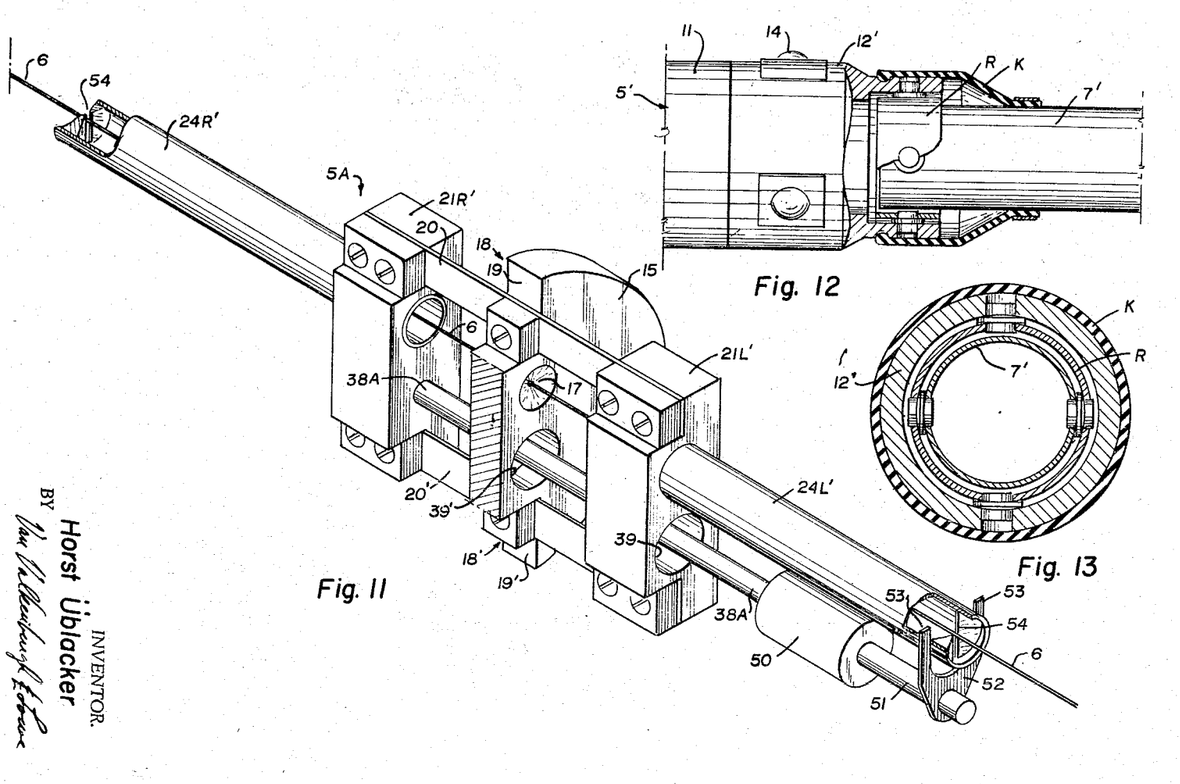
FIGURE 11 is an isometric view of the operative portions of a deflection indicator similar to the type illustrated at FIGS. 4 to 8, but of a modified construction.
FIGURE 12 is a fragmentary view, partly in section, similar to FIG. 5, but showing an alternate construction of connections of the deflection indicator with the spacing pipes.
FIGURE 13 is a transverse sectional view as taken from the indicated line 13—13 at FIG. 12.

FIGURE 11 illustrates portions of a modified deformation indicator 5A which is used in the same manner as the deformation indicator 5 heretofore described, the figure omitting the housing 11 and supporting heads 12 which are not changed. As in that indicator, the arrangement includes the disc 15 which divides the housing 11 into two compartments. An orifice 17 through which wire 6 extends is located in this disc in the "normal" plane. Notches 18 and 18' are formed which have flats 19 and 19', and springs 20 and 20' are mounted on the flats to lie in the normal plane. Clamp plates 21R' and 21L' are secured to the respective ends of the springs and tubular arms 24R' and 24L' outstand from the clamp plates 21R' and 21L' with the wire 6 being within the arms. A tongue 38A is connected to the clamp plate 21R' and extends through an opening 39' in the disc 15 and thence through an opening 39 in the clamp plate 21L' and towards the opposing end of the arm 24L'. A conventional rotary-type transducer 50 is mounted upon this arm 38A with the transducer shaft 51 extending therefrom in axial alignment with the arm 24L' and to the end of the arm. A forked crank 52 is attached to the end of this shaft with the fingers 53 of the fork embracing the arm 24L'. Movement of this arm 24L' laterally to the normal plane effects rotation of the shaft 51 of the transducer 50. Movements of the wire in a direction lateral to the normal plane to shift the arms 24R' and 24L' is effected by a slotted orifice 54 in the end of each tubular arm 24R' and 24L'. The slot lies in the normal plane and, therefore, movements of the wire 6 in the direction of the normal plane will not move the arms 24R' and 24L'.

Figure 14:
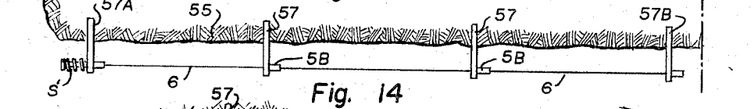
FIGURE 14 is a diagrammatic view of another embodiment of the invention where the apparatus is mounted along a rock face.
Figure 15:
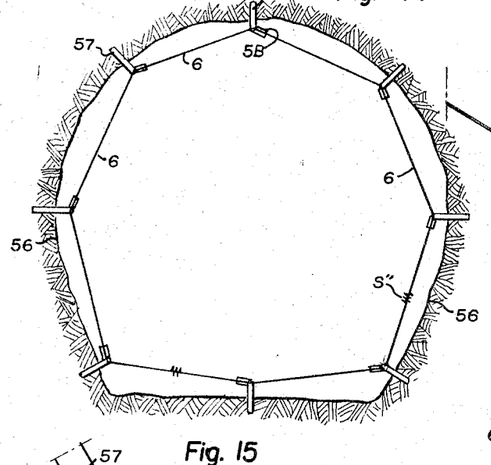
FIGURE 15 is a diagrammatic view of another embodiment of the invention where the apparatus is mounted about a tunnel addit as to form a closed course.

The apparatus above described is not only adapted to measure deflection in a borehole, but may also measure deflections along an open rock face as illustrated at FIG. 14, or about a tunnel section 56 as illustrated at FIG. 15.

In FIG. 14, the wire 6 is aligned along the rock face 55 by mounting the wire and deformation indicators on posts 57 at selected stations along the course of the rock face. These posts 57 are rigid members anchored in the rock face as by being grouted into drill holes in the rock. One post at one end of the group is a head post 57A at a position analgous to the tension box 4 above described, and the post at the opposite end of the group is an anchor post 57B. The wire 6 is tightly stretched between these posts as by a spring S' at the head post 57A. A deformation indicator 5B is mounted at each intermediate post 57 and each deformation indicator may be similar to one of the deformation indicators as heretofore described, or of a modified type similar to the indicators illustrated at FIGS. 16, 17 or 18, as will be hereinafter described.

In FIG. 15, the wire 6 is aligned about a tunnel section by mounting it and suitable deformation indicators at selected positions by a series of posts 57, the wire forming a closed path as illustrated. To hold the wire in a tight position, a suitable number of springs S'' may be located between selected posts 57. It is to be noted that the only real difference between the FIG. 15 ararngement and the arrangements previously discussed is that the wire is initially deflected at a substantial angle at each post 57. However, by properly setting and zeroing-in the deflection indicators, the same results may be obtained.

While a deformation indicator such as 5 or 5A, heretofore described, is satisfactory for arrangements such at at FIGS. 14 and 15, the use of posts rigidly anchored into the concrete permit a simplification of structure, for angular variation may be measured between the wire and post. Also, an arrangement is possible which will permit measurements in two planes simultaneously. A simple disc or plate 58 is secured to a post 57 and a knife edge orifice 17' to hold the wire 6 is formed in the plate 58.

Figure 16:
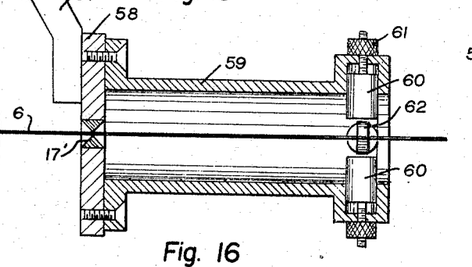
FIGURE 16 is a longitudinal sectional view of yet another form of deflector indicator, which is especially adapted for measurement of deflection in two complementary planes and for measurements in arrangements shown at FIGS. 14 and 15.
Figure 17:
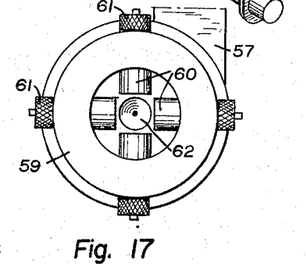
FIGURE 17 is an end elevational view of the showing at FIG. 16.

The modified deflection indicator 5B illustrated at FIGS. 16 and 17 outstands from one side of this plate 58 and includes a cylindrical arm 59 about the orifice 17' which the wire 6 normally extending axially therethrough. The outer end of this arm 59 carries four solenoids 60 spaced 90 degrees apart in a symmetrical array about the wire and with suitable adjusting nuts 61 being provided to set the individual solenoids at the commencement of a test. The wire 6 carries a small circular armature 62 which is suspended between the solenoids to vary their inductive effect. It is immediately manifest that very slight movements of this armature 62 in any direction will impose reactions between the solenoids 60 which may be calibrated on a suitable instrument to record the absolute movement of the wire or the components thereof in selected reference planes such as the horizontal and vertical planes. Such recordings may be made with a high degree of sensitivity and accuracy.

Figure 18:
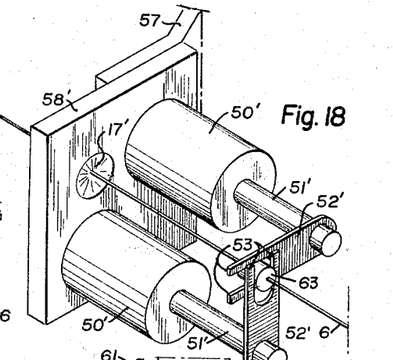
FIGURE 18 is an isometric view of yet another form of deflector indicator which may be used for measurement of deflection in two complementary planes.
Figures 19, 20, 21:
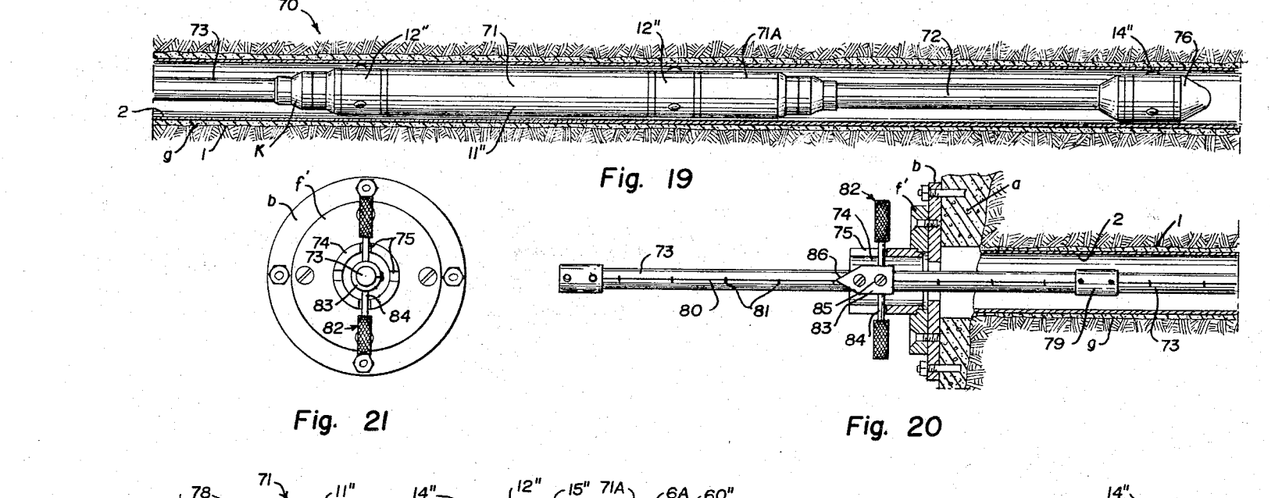
FIGURE 19 is a longitudinal sectional view of a portion of a borehole, wherein an improved chain deflectometer is installed.
FIGURE 20 is a longitudinal sectional view of the mouth portion of the borehole, illustrated at FIG. 19, wherein controls for the apparatus shown at FIG. 19 are located.
FIGURE 21 is an end elevational view of the apparatus shown at FIG. 20, as taken from the indicated arrow 21 at FIG. 20.
Figure 22:
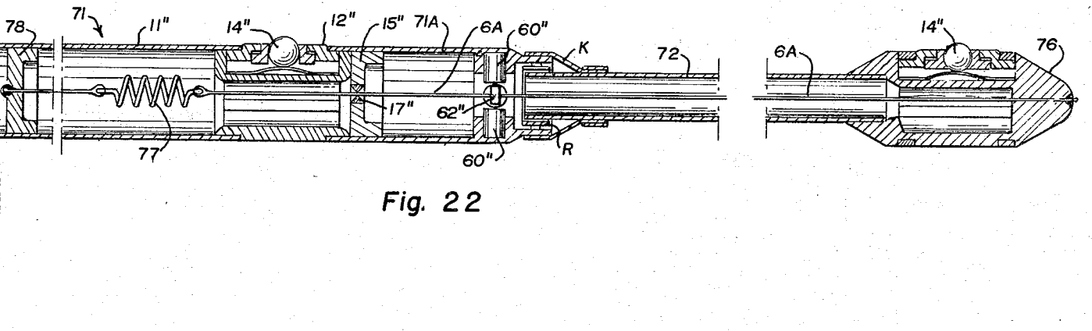
FIGURE 22 is a longitudinal sectional view of the chain deflectometer shown at FIG. 19, but on an enlarged scale and with portions broken away to conserve space.

FIG. 18 illustrates another very sensitive type of deflection indicator 5C which is operable upon the same principles as the deflection indicator 5B, but which uses rotary transducers 50' in lieu of solenoids. In this arrangement, two conventional rotary transducers 50' are mounted upon the plate 58' to outstand therefrom with their axes being parallel to the wire 6 and being in selected reference planes such as the horizontal and vertical planes intersecting the wire 6. Each rotary transducer 50' includes a shaft 51' at its axis which carries a forked crank arm 52'. The fingers 53' of each arm embrace a button 63 carried on the wire 6 so that very slight movements of the wire 6 in any direction will cause rotation of one or both of the transducer shafts 51'.

FIGS. 19 through 22 illustrate a further modification of the apparatus where a short wire 6A is mounted within a chain deflectometer 70 of the type which is inserted into a borehole to measure its alignment at various positions therein. The deflectometer consists of a body section 71 which remains axially aligned with the pipe, a projecting arm 72 which extends into the borehole ahead of the body section to sense changes in the alignment of the hole, and an insertion rod 73 which is formed as a series of measured pipe lengths connected together and to the body section to facilitate moving it into the borehole 1.

The borehole 1 is prepared as heretofore described, by grouting a casing 2 in place and providing a mounting base flange b at the abutment of the hole. A holding flange f' is secured to this base flange b and includes a lock head 74 formed as a short tubular member having a diametrically opposing castellation slot 75 to secure a lock member, as will be described.

The body section 71 is formed as a cylindrical housing 11'' having a supporting ring 12'' adjacent to each end of the housing 71. Each ring carries three spring-loaded spacing balls 14'' which are adapted to hold the body section in axial alignment in the hole at all times.

The projecting arm 72, of smaller diameter than the housing, is secured to the end of a short housing portion 71A extending from one ring 12'' by a universal joint such as that formed by gimbal ring R, and the joint is protected by a rubber collar K. This arm 72 extends a suitable distance forwardly from the end of the body section and carries a guiding head 76 at its extended end. The guiding head includes three sprin-loaded spacing balls 14'' oriented about the head at 120-degree spacings, the balls being adapted to hold the head 76 at the axial center of the borehole casing 2.

It follows that changes of borehole alignment in the reach between the body and head will cause bending at the universal joint, and such bending as may be observed as the apparatus is pushed into the borehole permits computations of the borehole alignment.

To record such bending action, a wire 6A is extended from the end of the head, through the arm and through the body section. It is held in an axially centered position in the body by passing through an orifice 17″ in a disc 15″ located in the body portion 71A adjacent to the ring 12″. Accordingly, deflections of the arm 72 about the universal joint will cause the wire to deflect with respect to the plane of the disc 15″.

This permits a transducer to be mounted in the housing portion 71A between the disc 15″ and arm 72 to record such deflections, and a preferable type will include four solenoids 60″ arranged at 90-degree positions, as about an armature 62″ on the wire 6A. Such is substantially the same arrangement as in the unit illustrated at FIGS. 16 and 17.

With such arrangement, it is possible to measure deflections in two reference planes at the same time and accordingly, the chain deflectometer may be inserted into a borehole without the necessity of rotating it, although such rotations may be desirable for checking out various measurements. The wire 6A is extended through the orifice 17″ and into the housing 11″ and connects with a tensioning spring 77 therein which, in turn, is anchored to an abutment 78 at the opposite end of the body.

The measuring rods 73 are connected to an end of a ring 12″, preferably by a universal acting gimbal arrangement, similar to that heretofore described, and these rods may consist of a number of tubular sections which are interconnectable by couplings 79 of a type which will not permit one rod to rotate with respect to the other. To maintain the necessary alignment, a continuous longitudinal mark 80 is provided on each rod 73, and to determine the depth of insertion of the chain deflectometer, spacer lines 81 are marked on each rod alongside the mark 80.

The insertion rod assembly is held by a handle 82 having a central sleeve 83 from whence diametrically opposed arms 84 extend. The sleeve is also provided with suitable lock nuts 85 and a pointer 86 so that it may be positioned at any selected depth on the insertion rod 73 and pushed into a castellation slot 75 to a position for reading the apparatus. The apparatus is completed by an electrical circuit wire, not shown, which will extend from the mouth of the borehole preferably, but not necessarily, within the insertion rod.

Operation of this apparatus is a simple matter. The chain deflectometer is pushed into a borehole casing and is read either at selected intervals or continuously. Deflection readings will indicate any variation in alignment of the casing and will be immediately noted by movements of the guiding head 76 with respect to the body section 71 as reflected by flexing of the wire 6A in the orifice 17″.

I have now described my invention in considerable detail, and it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. Apparatus for measuring lateral deformation of a surface which is adjacent and substantially parallel to a selected course, comprising, in combination: a wire adapted to be extended along said course; means for anchoring the wire at one end of the course and for holding the wire under tension at the other end of the course; a lateral end anchor means at each end and a lateral intermediate anchor means at an intermediate location along said course adapted to hold the wire at said location in fixed relationship with the structure whereby lateral deformation of the structure at said location with respect to the ends shifts the wire; and, measuring means at said intermediate anchor means adapted to measure the change of alignment of the reaches of wire extending from each side of the intermediate location.

2. In the apparatus defined in claim 1, wherein said intermediate anchor means includes a holding disc having an orifice through which the wire extends, with changes of alignment of the wire occurring by bending of wire from the contact point at the orifice, and said measuring means includes a transducer means outstanding from the disc and being adapted to measure lateral movements of the wire as it bends at the orifice.

3. In the apparatus defined in claim 1, wherein said intermediate anchor means includes a holding disc having an orifice through which the wire extends, with the reach of wire at each side of the disc being adapted to bend at the contact point at the orifice and to move independently of the movement of the wire at the opposite side of the disc, and said measuring means includes a flexible carrier arm mounted at each side of the disc adapted to flex in a given reference plane, a slide contact on each arm directed normal to the reference plane adapted to hold the wire with a sliding fit and to cause the carrier arm to flex responsive to movement components of the wire in directions of the reference plane but to cause no movement of the carrier arm responsive to movement of components of the wire in directions normal to the reference plane.

4. Apparatus for measuring lateral deformation in a borehole lined with a casing, and comprising, in combination: a wire anchored at the bottom of the borehole, extended therethrough and held under tension at the mouth of the borehole; a flexible tubular system extended into the borehole about the wire including deformation indicators spaced apart by connecting pipes, with the deformation indicators being held in lateral positions by the borehole casing walls, the connecting pipes being adapted to deflect responsive to lateral deformations in the borehole and the system to be rotated within the borehole to place the components at selected reference planes with respect to the borehole axis; a transverse disc within each deformation indicator having an orifice therein, wherethrough the wire passes; and, measuring means within each deformation indicator adapted to measure angular changes of the wire reaches between the deformation indicators as the wire bends at the orifices therein responsive to lateral deformations within the borehole.

5. In the apparatus defined in claim 4, including a longitudinally-disposed, flat spring means mounted on the disc and being adapted to deflect in a direction normal to the plane of the spring responsive to movements of the wire to define wire movement components in the direction of spring deflection, and wherein said measuring means is responsive to movement of the spring means and being thereby adapted to measure only components of wire deflection in said reference plane.

6. In the apparatus defined in claim 4, including a pair of longitudinally-disposed, flat springs, each being secured to the disc to lie in a common plane with the wire and with the wire extending between the springs, each spring extending from each side of the disc and a clamp plate interconnecting the springs at each end thereof, a tubular arm extending from the clamp plate about the wire, a slotted holding means within each arm adapted to hold the wire in a direction normal to the plane of the springs, but to permit the wire to slide in a direction along the plane, whereby components of movements of the wire about the orifice in a direction normal to the plane will flex the arms and components of movements of wire in the direction along the plane will not effect the arms in the direction out of the normal plane by movements of the wire.

7. In the apparatus defined in claim 6, including a tongue affixed to one clamp plate and extending longitudinally to the arm outstanding from the other clamp, and wherein said measuring means consists of a transducer means having one component carried on the tongue and the other component carried on the arm.

8. Apparatus for measuring lateral deformation in a borehole comprising an elongate body section having a slidable holding means at each end thereof adapted to hold the body in axial alignment in the borehole, an arm projecting from one end thereof having a head at its extended end with slidable holding means on the head adapted to hold the head at the axial center of the borehole, a universal joint connection at the juncture of the arm with the body adapted to permit the arm to flex responsive to changes in borehole alignment between the body position and the head position, a deflection measuring means adapted to measure deflections of the head with respect to the body, and an insertion means adapted to insert the apparatus into and out of the borehole.

9. The apparatus defined in claim 8, wherein the insertion means includes a rod connected to the body at the end opposite to the arm connection.

10. The apparatus defined in claim 8, wherein said deflection measuring means includes an axially centered wire extending through the body and arm and being held at each end under tension, a disc within the body adjacent to the arm having an orifice therein through which the wire extends, and a transducer means outstanding from the disc and extending towards the arm and being adapted to measure movements of the wire as it bends at the orifice responsive to deflections of the arm with respect to the spring.

11. In the apparatus defined in claim 10, including a spring within the body adapted to hold the wire under tension.

12. A method for determining lateral deformations in a borehole, including the steps of stretching a wire in the borehole, laterally holding each end of the wire reach at a fixed position with respect to the borehole wall adjacent thereto and laterally holding the wire at, at least one, selected intermediate location at a fixed position with respect to the borehole wall adjacent thereto and measuring changes of angular alignment of the wire at said intermediate location when the wire is deflected at the intermediate location responsive to lateral deformation of the borehole at this location with respect to the ends thereof.

13. A method for determining lateral deformations in a borehole in the direction of a selected longitudinal reference plane through the borehole including the steps of stretching a wire through the borehole, laterally holding each end of the wire at a fixed position with respect to the borehole adjacent thereto, laterally holding the wire at at least one selected intermediate location at a fixed position with respect to the borehole wall adjacent thereto and measuring said reference plane components of changes of angular alignment of the wire at said intermediate location when the wire is deflected at the intermediate location responsive to lateral deformations of the borehole at this location with respect to the ends thereof.

14. The method for determining relative lateral alignment and deformations in a borehole, including the steps of holding a wire under tension along a selected reach within the borehole, laterally holding each end of the wire at a fixed position with respect to the borehole wall adjacent thereto and laterally holding the wire at an intermediate location, between the ends thereof, at a fixed position with respect to the borehole wall adjacent thereto, and measuring the angular deflection of alignment of the wire at said intermediate position.

15. A method for determining the deformations of a surface at a selected course, adjacent and substantially parallel to the surface, including the steps of stretching a wire, laterally holding the wire at fixed positions with respect to the surface at not less than three spaced locations along said course, establishing an initial angular alignment of the wire reaches between said fixed locations and measuring the changes of the angular alignment between the wire reaches when the wire moves at one of the locations responsive to deformations at the surface adjacent to such location with respect to the surface at other locations.

16. In the method set forth in claim 15, wherein said reach is varied by moving the wire along the course of the borehole and measurements of the angular deflection of the wire are made while moving the wire whereby the relative lateral deformations and alignment of the borehole alignment may be established.

17. A method of measuring lateral deflections and lateral alignment in a borehole including the steps of:
  (a) inserting an elongated, rigid multi-sectioned member into the borehole, having an articulated section connection;
  (b) providing a means adjacent to each end of the member and at said section connection adapted to engage the wall of the borehole;
  (c) stretching a wire along said member and holding the wire with the member at a point adjacent to each end and adjacent to said section connection; and
  (d) providing a means at said section connection adapted to measure the angular deflection of the wire as the section connection is articulated by lateral changes of borehole alignment.

18. In the method defined in claim 17 including the steps of moving the member through the borehole and measuring changes of angular deflection along the course of movement whereby to establish the borehole alignment.

19. In the method defined in claim 17 including the step of anchoring an end of the member into the borehole.

20. Apparatus for measuring the lateral variation of a surface of the structure at a reach along the selected course comprising:
  (a) an engaging means adapted to establish at least three spaced locations alongside the surface to provide two end locations and at least one intermediate location;
  (b) a wire extended between the end locations;
  (c) a means for holding the wire under tension;
  (d) a means associated with each said engaging means and contacting the structure surface adapted to hold the taught wire at a position which is laterally affixed to each said location with respect to the surface at that location whereby relative lateral movement of the structure surface will change the angular alignment of the wire extending from each side of the engaging means at the intermediate location adjacent thereto; and
  (e) a means for measuring the angular alignment at said intermediate location.

21. In the apparatus defined in claim 17 wherein said engaging means comprise posts outstanding from the surface.

22. In the organization set forth in claim 17 wherein said engaging means include a two-piece, elongated, articulated member having an enlarged portion at each end and adjacent to the articulated connection adapted to contact the surface.

References Cited

UNITED STATES PATENTS

| | | | |
|---|---|---|---|
| 3,065,633 | 11/1962 | Lubinski | 33—205 X |
| 3,121,954 | 2/1964 | Foster | 33—1 |
| 3,148,653 | 9/1964 | Shatto et al. | 33—1 X |

LEONARD FORMAN, *Primary Examiner.*

H. N. HAROIAN, *Assistant Examiner.*